US011485899B2

(12) United States Patent
Shumway et al.

(10) Patent No.: US 11,485,899 B2
(45) Date of Patent: Nov. 1, 2022

(54) METHODS OF REDUCING ZINC CONCENTRATION IN FLUIDS

(71) Applicant: Halliburton Energy Services, Inc., Houston, TX (US)

(72) Inventors: William Walter Shumway, Spring, TX (US); Hui Zhou, The Woodlands, TX (US); Preston Andrew May, Porter, TX (US)

(73) Assignee: Halliburton Energy Services, Inc., Houston, TX (US)

(*) Notice: Subject to any disclaimer, the term of this patent is extended or adjusted under 35 U.S.C. 154(b) by 119 days.

(21) Appl. No.: 16/703,799

(22) Filed: Dec. 4, 2019

(65) Prior Publication Data
US 2021/0171819 A1 Jun. 10, 2021

(51) Int. Cl.
*C09K 8/035* (2006.01)
*C09K 8/528* (2006.01)
*C09K 8/536* (2006.01)

(52) U.S. Cl.
CPC .............. *C09K 8/528* (2013.01); *C09K 8/035* (2013.01); *C09K 8/536* (2013.01)

(58) Field of Classification Search
CPC ......... C09K 8/528; C09K 8/035; C09K 8/536
See application file for complete search history.

(56) References Cited

U.S. PATENT DOCUMENTS

| | | | |
|---|---|---|---|
| 5,246,684 A | 9/1993 | Brown et al. | |
| 5,766,478 A | 6/1998 | Smith et al. | |
| 5,891,956 A | 4/1999 | Smith et al. | |
| 7,144,512 B2 | 12/2006 | Qu et al. | |
| 7,172,703 B2 | 2/2007 | Javora et al. | |
| 7,201,225 B2 | 4/2007 | Smith et al. | |
| 7,546,874 B2 | 6/2009 | Smith et al. | |
| 7,674,384 B2 | 3/2010 | Javora et al. | |
| 7,736,521 B2 | 6/2010 | Sloan et al. | |
| 7,905,287 B2 | 3/2011 | Oyler et al. | |
| 8,123,953 B2* | 2/2012 | Gibbison | C02F 1/683 210/692 |
| 8,518,232 B1* | 8/2013 | Harrison | C25B 1/21 205/539 |
| 9,034,180 B2 | 5/2015 | McGuire | |
| 9,215,891 B2 | 12/2015 | Nazir et al. | |
| 9,249,478 B2 | 2/2016 | Harrison et al. | |
| 9,644,126 B2 | 5/2017 | Harrison et al. | |
| 2006/0231255 A1* | 10/2006 | Oyler | C09K 8/501 166/295 |
| 2009/0184056 A1 | 7/2009 | Smith et al. | |
| 2011/0247986 A1* | 10/2011 | Zhang | E21B 21/068 210/721 |
| 2014/0360945 A1 | 12/2014 | Vittur | |
| 2016/0060133 A1 | 3/2016 | Vollmer et al. | |
| 2017/0136427 A1 | 5/2017 | Smith | |
| 2017/0233630 A1* | 8/2017 | Nalepa | C09K 8/05 507/145 |
| 2018/0023376 A1* | 1/2018 | Davis | E21B 21/063 166/267 |
| 2019/0031793 A1 | 1/2019 | Smith | |

FOREIGN PATENT DOCUMENTS

| | | | |
|---|---|---|---|
| WO | 2010065603 A1 | 6/2010 | |
| WO | 2015/174965 A2 | 11/2015 | |
| WO | 2017/096195 A1 | 6/2017 | |

OTHER PUBLICATIONS

I, A. Pawar, et al., Ultrasound-based treatment approaches for intrinsic viscosity reduction of polyvinylpyrrolidone, Ultrasonics Sonochemistry, 2014, 21, 1108-1116.*
International Search Report and Written Opinion issued in related PCT Application No. PCT/US2019/064645 dated Sep. 20, 2020, 12 pages.

* cited by examiner

*Primary Examiner* — Kumar R Bhushan
(74) *Attorney, Agent, or Firm* — Tenley Krueger; C. Tumey Law Group PLLC

(57) ABSTRACT

Methods for reducing zinc in fluids for use in subterranean formations are provided. In one or more embodiments, the methods include providing a fluid comprising an aqueous base fluid and zinc; and adding a precipitant comprising polyvinylpyrrolidone or any derivative thereof to the fluid to form a precipitate with at least a portion of the zinc.

20 Claims, 1 Drawing Sheet

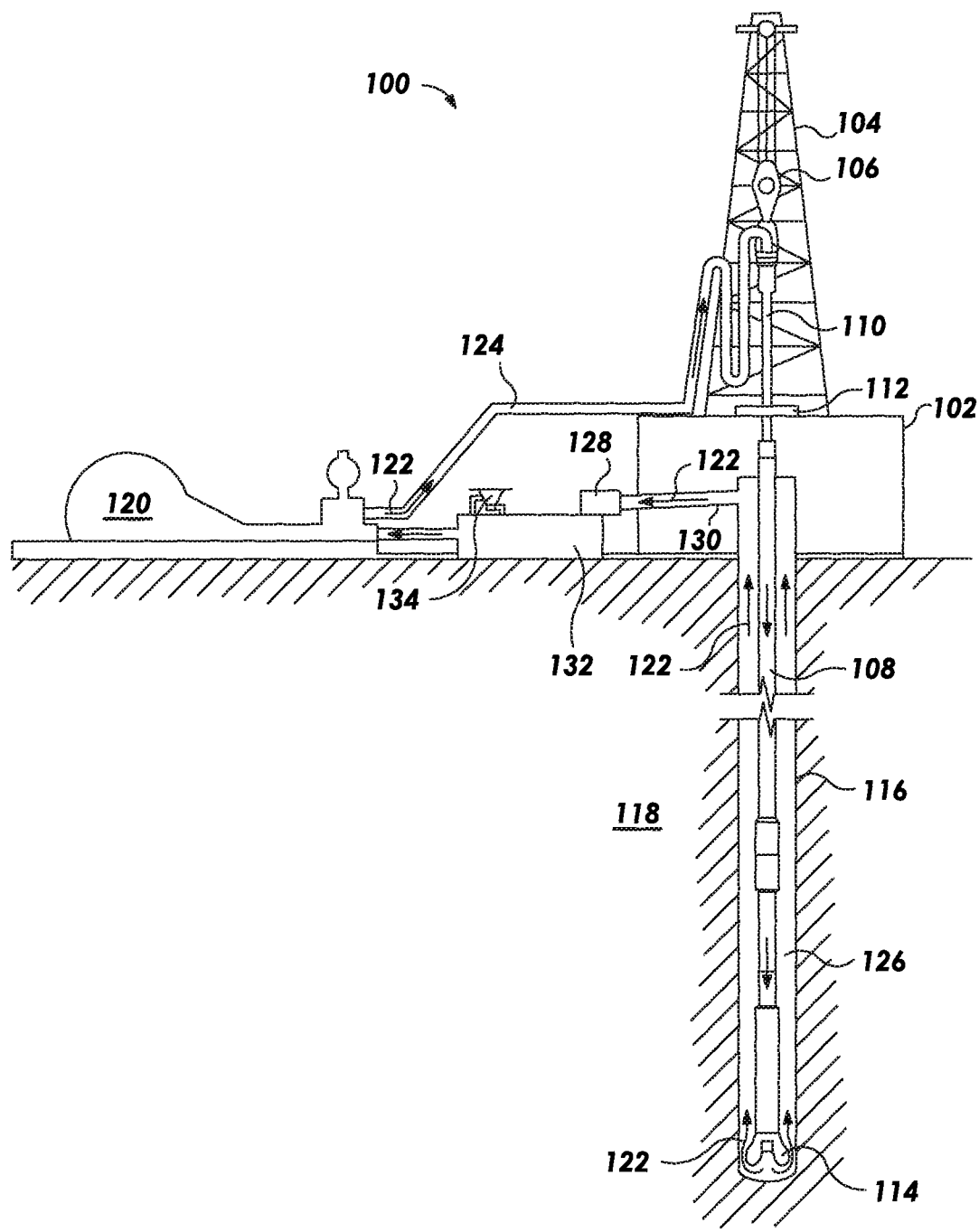

METHODS OF REDUCING ZINC CONCENTRATION IN FLUIDS

BACKGROUND

The present disclosure relates to methods for reducing zinc in fluids for use in subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling, fracturing, competition, and the like.

For example, while drilling an oil or gas well, a drilling fluid (or drilling mud) is typically pumped down to a drill bit during drilling operations and flowed back to the surface through an annulus defined between a drill string and the walls of the wellbore. Drilling fluids often include viscosifiers to, for example, improve the ability of the drilling fluid to remove cuttings from the wellbore and suspend cuttings. Unconsolidated or poorly consolidated formations generally are high permeability production intervals and are often drilled with specialized drilling fluids referred to in the art as "drill-in fluids." Drill-in fluids are specially designed for drilling through a subsurface hydrocarbon reservoir portion of a wellbore. Such fluids are generally formulated to minimize formation damage and maximize production of the zones exposed by the drilling.

Like drilling fluids, drill-in fluids generally include polymers for providing viscosity, suspension, and fluid loss control. Drilling fluids, drill-in fluids, and other subterranean treatment fluids can become contaminated with metal ions, such as zinc, which can pose certain problems for operators as well as environmental concerns. Salts of zinc also can be added in conjunction with other salts, such as calcium bromide or calcium chloride, to achieve a desired density of a fluid with lower concentrations compared to other salts. However, brines including zinc are particularly corrosive due to an inherently low pH. Contaminated fluids often must undergo reclamation processes to be reused or recycled.

BRIEF DESCRIPTION OF THE DRAWINGS

These drawings illustrate certain aspects of some of the embodiments of the present disclosure and should not be used to limit or define the claims.

FIG. 1 is a diagram illustrating an example of a drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those of ordinary skill in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

The present disclosure relates to methods for reducing zinc in fluids for use in subterranean formations. More specifically, the present disclosure provides methods for reducing the concentration of zinc in aqueous-based treatment fluids that may be used to treat subterranean formations. In certain embodiments, the methods of the present disclosure may include providing a treatment fluid including an aqueous based fluid and one or more zinc-containing species. In certain embodiments, the methods of the present disclosure may further include adding a precipitant to the treatment fluid and allowing the precipitant to form a precipitate with at least a portion of the zinc. In certain embodiments, the methods of the present disclosure may further include separating at least a portion of the precipitate from the aqueous base fluid.

Those of ordinary skill in the art having the benefit of the present disclosure will appreciate the types of treatment fluids including an aqueous based fluid and one or more zinc-containing species disclosed herein that may be used in accordance with the methods of the present disclosure. Examples of such treatment fluids include, but are not limited to, drill-in fluids, drilling fluids, completion fluids, workover fluids, fracturing fluids, acidizing fluids, suspension fluids, breaker fluids, packer fluids, logging fluids, spacer fluids, transition fluids, and the like.

Among the many potential advantages to the methods and compositions of the present disclosure, only some of which are alluded to herein, the compositions and methods of the present disclosure may, inter alia, aid in the removal of zinc from a fluid that was previously used to treat a subterranean formation (e.g., a drilling fluid), which may allow for at least a portion of the fluid to be recycled or reused to treat the same or another subterranean formation.

In certain embodiments, the zinc-containing fluids of the present disclosure may include any aqueous base fluid known in the art. The term "base fluid" refers to the major component of the fluid (as opposed to components dissolved and/or suspended therein) and does not indicate any particular condition or property of that fluids such as its mass, amount, pH, etc. Aqueous base fluids that may be suitable for use in the methods of the present disclosure may include water from any source. Such aqueous base fluids may include salt water (e.g., water containing one or more salts dissolved therein), brine (e.g., saturated salt water), seawater, or any combination thereof. In some embodiments, the aqueous base fluids may include one or more ionic species, such as those formed by salts dissolved in water. For example, seawater and/or produced water may include a variety of divalent cationic species dissolved therein. In certain embodiments, the ionic species may be one or more salts selected from the group consisting of: lithium chloride, lithium bromide, lithium iodide, sodium chloride, sodium bromide, sodium iodide, sodium acetate, sodium formate, sodium citrate, potassium chloride, potassium formate, potassium iodide, potassium bromide, calcium chloride, calcium nitrate, calcium bromide, calcium iodide, magnesium chloride, magnesium bromide, magnesium sulfate, cesium formate, cerium bromide, manganese bromide, and any combination thereof. In certain embodiments, the density of the aqueous base fluid can be adjusted to, among other purposes, provide additional particulate transport and suspension. In certain embodiments, the pH of the aqueous base fluid may be adjusted (e.g., by a buffer or other pH adjusting agent) to a specific level, which may depend on, among other factors, the types of clays, acids, and other additives included in the fluid. Those of ordinary skill in the art having the benefit of the present disclosure will recognize when such density and/or pH adjustments are appropriate.

In certain embodiments, the fluids of the present disclosure may include zinc. The zinc may be in present in the fluid in any form, including, but not limited to, salts (e.g., zinc chloride, zinc bromide, zinc iodide), ions formed by at least a portion of the salt dissolving in the aqueous base fluid, and/or complexes (e.g., zinc hydroxide). Those of ordinary skill in the art having the benefit of the present disclosure will recognize that the zinc-containing fluids containing any amount of zinc may be used in the methods of the present disclosure. In certain embodiments, the fluids used in the methods of the present disclosure may include the zinc in an amount greater than about 5 ppm. In certain embodiments, the fluids of the present disclosure may contain amount of zinc such that the density of the fluids remains less than about 14.8 pounds per gallon ("ppg").

In certain embodiments, the zinc-containing fluids used in the methods of the present disclosure may have been used to treat a subterranean formation (e.g., as a drilling fluid or drill-in fluid). Thus, the zinc-containing fluids may also have one or more solids suspended or mixed therein, such as lost circulation materials, bridging agents, solid breakers, internal breakers, proppant, solid alkalinity control agents, solids from the subterranean formation (e.g., rock fragments generated by the drill bit during drilling), and any combination thereof. Examples of lost circulation materials or bridging agents that may be suitable include, but are not limited to, BARACARB® particulates (ground marble, available from Halliburton Energy Services, Inc.) including BARACARB® 5, BARACARB® 25, BARACARB® 50, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); acid soluble bridging solids including magnesium and calcium carbonate, limestone, marble, dolomite, iron carbonate, iron oxide, calcium oxide, magnesium oxide, perborate salts and the like; and any combination thereof.

In certain embodiments, the zinc-containing fluids used in the methods of the present disclosure may include any number of additives. Examples of such additives include, but are not limited to, additional salts, surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, friction reducers, antifoam agents, additional bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), particulates, and the like. Those of ordinary skill in the art having the benefit of the present disclosure will recognize the types of additives that may be included in the fluids of the present disclosure for a particular application.

In certain embodiments, the methods of the present disclosure may include adding a precipitant to the zinc-containing fluid. In such embodiments, the precipitant may form a precipitate with at least a portion of the zinc. In certain embodiments, the precipitant used in the methods of the present disclosure may be a polymer including polyvinylpyrrolidone (PVP) or any derivative thereof. In certain embodiments, the precipitate may include one or more vinylpyrrolidone monomers (or any derivative thereof) and zinc bonded thereto. In certain embodiments, the precipitate may be a solid and/or a semi-solid. The polymers may be linear, branched, and/or "crosslinked" with a crosslinking agent. In some embodiments, the polymer including polyvinylpyrrolidone or a derivative thereof may have a molecular weight of at least 6,000 g/mol. In certain embodiments, other precipitants that form precipitates with zinc, such as lime, also may be added to the zinc-containing fluid. In such embodiments, the other precipitants may be added to the zinc-containing fluid before, after, and/or along with the precipitant including the polymer that includes polyvinylpyrrolidone (PVP) or any derivative thereof. As used herein, the term "lime" includes any inorganic compound containing calcium and an oxide, carbonate, or hydroxide. The lime can be: quicklime, which is calcium oxide (CaO); slaked lime, which is calcium hydroxide ($Ca(OH)_2$); limestone, which is calcium carbonate ($CaCO_3$), or combinations thereof. In certain embodiments, the lime may be added to the zinc-containing fluid in an amount from about 3 to about 35 pounds per barrel (ppb) of the fluid.

The precipitant may be added to the zinc-containing fluid in any amount sufficient to precipitate out at least a portion of the zinc. Those of ordinary skill in the art having the benefit of the present disclosure will appreciate that the amount of precipitant added to the zinc-containing fluid may depend on, among other things, the amount of zinc in the fluid. In certain embodiments, one or more steps of the methods of the present disclosure may be automated to be performed without human intervention. For example, the addition of the precipitate to the zinc-containing fluid may be performed by automated equipment based on, for example, the amount of zinc in the zinc-containing fluid. In certain embodiments, one or more measurement devices may automatically measure the amount of zinc in the zinc-containing fluid, and a controller may control the amount of precipitant added to the zinc-containing fluid by, for example, adjusting a valve coupled to a tank or vessel including the precipitant. In such embodiments, the zinc-containing fluid may be located in a tank, vessel, or pipeline connected to the tank or vessel containing the precipitant.

In certain embodiments, the precipitant may be added to the zinc-containing fluid in any amount sufficient to precipitate out at least about 40% of the zinc. In other embodiments, the precipitant may be added to the zinc-containing fluid in any amount sufficient to precipitate out at least about 50% of the zinc. In other embodiments, the precipitant may be added to the zinc-containing fluid in any amount sufficient to precipitate out at least about 60% of the zinc. In other embodiments, the precipitant may be added to the zinc-containing fluid in any amount sufficient to precipitate out at least about 70% of the zinc. In other embodiments, the precipitant may be added to the zinc-containing fluid in any amount sufficient to precipitate out at least about 80% of the zinc. In other embodiments, the precipitant may be added to the zinc-containing fluid in any amount sufficient to precipitate out at least about 90% of the zinc. In other embodiments, the precipitant may be added to the zinc-containing fluid in any amount sufficient to precipitate out at least about 95% of the zinc.

In certain embodiments, the precipitant may be added directly to the zinc-containing fluid, e.g., as a powder or a solution. In other embodiments, the precipitant may be dissolved or dispersed in second fluid and that fluid may be combined with the zinc-containing fluid. In such embodiments, the concentration of the zinc in the resulting fluid may be lower than in the initial fluid as the result of dilution as well as precipitation and subsequent separation (as described below).

In some embodiments, the methods of the present disclosure may include at least partially breaking the precipitant in the second fluid prior to the combining the second fluid with the zinc-containing fluid. As used herein, the terms "break" and "breaking" refer to the separation of a polymer into two or more units, each having a lower molecular weight than the polymer. In such embodiments, a sonication or other cavitation technique may be applied to at least a portion of the second fluid including the precipitant to break at least a portion of the precipitant. In such embodiments, sonicating the second fluid may include exposing and/or irradiating the treatment fluids with an ultrasonic wave. In certain embodiments, the ultrasonic wave may have sufficient energy to cause cavitation of the second fluid, resulting in at least partial breaking (e.g., chain scission) of the polymer. Examples of sonication techniques that may be suitable for use in the methods of the present disclosure include, but are not limited to, submersion of an ultrasonic probe, ultrasonic horn, ultrasonic vibrator, ultrasonic homogenizer, or other sonication device into the treatment fluids; flow-through sonication, such as a flow-cell containing a sonicator; and indirect sonication (i.e., transmitting ultrasonic waves through a fluid that is indirect contact with another fluid (e.g., an ultrasonic bath)). Examples of cavitation techniques that may be suitable for use in the methods of the present disclosure include, but are not limited to, hydrodynamic cavitation such as centrifugal pumps, marine propellers, and water turbines, as well as ultrasonic induced cavitation (e.g., via sonication). Those of ordinary skill in the art having the benefit of the present disclosure will appreciate other sonication and cavitation techniques that may be used in accordance with the methods of the present disclosure.

In certain embodiments, breaking the precipitant may include adding a chemical breaker to the second fluid. Examples of chemical breakers that may be suitable for use in the methods of the present disclosure include, but are not limited to, peroxides (such as hydrogen peroxide, t-butylhydroperoxide), perborates (such as sodium perborate), percarbonates, persulfates (such as ammonium, sodium, potassium persulfate), permanganates, bromates (such as sodium bromate), chlorates, hypochlorites, and any combination thereof. In some embodiments, oxidizing breakers such as those listed above may also be used in combination with one or more reducing agents, among other reasons, to lower their activation temperature. In such embodiments, the reducing agents may include, but not limited to, sulfites, bisulfites, metabisulfites, thiosulfate, iron (II), ferrous ($Fe2+$) salts, ascorbic acid and salts, thiourea, amines (such as tetramethyethylenediamine), alcohols, and any combination thereof.

In yet other embodiments, the zinc-containing fluid may be passed through a filter media that includes the precipitant. As used herein, the term "filter media" means a material through which the zinc-containing fluid is passed and is capable of absorbing and/or entrapping, and thereby removing, at least a portion of the zinc. Examples of filter aids that may be suitable for use in the methods of the present disclosure include, but are not limited to, filter paper and a sintered glass funnel. In such embodiments, the precipitant may be included on or in the filter media in a concentration sufficient to cause some or all of the zinc to become insoluble in the zinc-containing fluid. In such embodiments, one or more zinc-binding compounds also may be included on or in the filter media. Examples of zinc-binding compounds that may be suitable for use in the methods of the present disclosure include, but are not limited to, porphyrin, ethylenediamine tetraacetic acid (EDTA), iminodisuccinic acid (IDS), polyaspartic acid, ethylenediamie-N,N'-disuccinic acid (EDDS), methylglycinediacetic acid (MGDA), and L-glutamic acid-N,N'-diacetic acid, tetrasodium salt (GLDA), and any combination thereof.

In some embodiments, a filter aid may be included on or in the filter media. Examples of filter aids that may be suitable for use in the methods of the present disclosure include, but are not limited to, diatomaceous earth, glass fibers, glass wool, silica gel, alumina, paper, activated charcoal, and any combination thereof. In certain embodiments, the zinc-binding compounds may be attached to the filter media and/or the filter aid via physical or chemical bonding. In some embodiments, the filter media may be included in a filter assembly. The filter assembly may be any type and may be either batch or continuous. Examples of filter assemblies that may be suitable for use in the methods of the present disclosure include, but are not limited to, parallel plate filters, Nutsche filters, rotary filters, and vertical- or horizontal-tubular filters. Any of these means for contacting the zinc-containing fluid with the precipitant will be deemed to be "adding a precipitant to the zinc-containing fluid" for the purposes of the present disclosure.

In certain embodiments, the methods of the present disclosure may include separating at least a portion of the precipitate from the aqueous base fluid. The separation of the precipitate from the aqueous base fluid may be achieve through any known separation technique. Examples of such techniques include, but are not limited to, vacuum filtration, diatomaceous earth filtration, centrifugal filtration, settling, and any combination thereof. Those of ordinary skill in the art having the benefit of the present disclosure will appreciate other separation techniques that may be used in accordance with the methods of the present disclosure.

In certain embodiments, as discussed above, the zinc-containing fluids used in the methods of the present disclosure may include one or more solids (e.g., lost circulation materials and bridging agents). In such embodiments, the methods of the present disclosure also may include the use of one or more separation or removal techniques on the zinc-containing fluids to separate the solids from the aqueous base fluid (e.g., brine). Examples of such techniques for removing solids from the aqueous base fluid may include, but are not limited to, settling, decantation, filtration, centrifugation, dissolution or dissolving (e.g., with acid), and any combination thereof. In some embodiment, the methods of the present disclosure also may include the use of other separation techniques (e.g., distillation) to remove other components (e.g., salts) from the base fluid. Those of ordinary skill in the art having the benefit of the present disclosure will appreciate other separation or removal techniques that may be used in accordance with the methods of this disclosure. In certain embodiments, these separation or removal techniques may be used before adding the precipitant to the zinc-containing fluid or before separating the precipitate from the aqueous based fluid. In certain embodiments, these separation or removal techniques may be used after adding the precipitant to the zinc-containing fluid or after separating the precipitate from the aqueous based fluid.

In certain embodiments, the methods of the present disclosure may include adding one or more additives, as described above, to the aqueous base fluid after at least a portion of the precipitate has been separated from the aqueous base fluid to form a treatment fluid. In such embodiments, the treatment fluid may be introduced into wellbore penetrating at least a portion of a subterranean formation. In some embodiments, a fresh based fluid (e.g., a fluid that has not yet been used to treat a subterranean formation) may be added to the treatment fluid before it is introduced into the subterranean formation and/or the wellbore.

In certain embodiments, the methods of the present disclosure may include using the disclosed treatment fluids to carry out a variety of subterranean treatments, including but not limited to, drilling. The drilling and/or drill-in fluids disclosed herein may directly or indirectly affect one or more components or pieces of equipment associated with the preparation, delivery, recapture, recycling, reuse, and/or disposal of the drilling and/or drill-in fluids. For example, and with reference to FIG. 1, the drilling and/or drill-in fluids disclosed herein may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling and/or drill-in fluid 122 of the present disclosure through a feed pipe 124 and to the kelly 110, which conveys the drilling and/or drill-in fluid 122 downhole through the interior of the drill string 108 and through one or more orifices in the drill bit 114. The drilling and/or drill-in fluid 122 may then circulated back to the surface via an annulus 126 defined between the drill string 108 and the walls of the borehole 116. At the surface, the spent drilling and/or drill-in fluid 122 exits the annulus 126 and may be conveyed to one or more fluid processing unit(s) 128 via an interconnecting flow line 130. The addition of the precipitant and/or the separation or removal technique(s) disclose herein may be performed in the fluid processing unit(s) 128. After passing through the fluid processing unit(s) 128, a "cleaned" drilling and/or drill-in fluid 122 with a reduced concentration of zinc is deposited into a nearby retention pit 132 (i.e., a mud pit). In at least one embodiment, for example, there could be more than one retention pit 132, such as multiple retention pits 132 in series. Moreover, the retention pit 132 may be representative of one or more fluid storage facilities and/or units where the drilling and/or drill-in fluid 122 or any component thereof (e.g., base fluid or brine) may be stored, reconditioned, and/or regulated until recycled or reused.

While illustrated as being arranged at the outlet of the wellbore 116 via the annulus 126, those skilled in the art will readily appreciate that the fluid processing unit(s) 128 may be arranged at any other location in the drilling assembly 100, any other wellsite location, or an off-site location to facilitate its proper function, without departing from the scope of the disclosure. In certain embodiments, the spent drilling and/or drill-in fluid 122 including zinc may be transported to an off-site location. In such embodiments, the spent drilling and/or drill-in fluid 122 may be stored in a tank or vessel for transport and/or for a period of time thereafter. A precipitant of the present disclosure may be stored at the off-site location in a separate tank or vessel. In certain embodiments, the precipitant of the present disclosure may be added to the spent drilling and/or drill-in fluid 122 while the fluid is in the transport and/or storage tank or vessel. In other embodiments, the spent drilling and/or drill-in fluid 122 may be transferred from the transport and/or storage tank or vessel to a second tank or vessel (e.g., a mixing tank), and the precipitant may be added to the second tank or vessel. The second tank or vessel optionally may contain a mixing device to mix the precipitant with the spent drilling and/or drill-in fluid 122. In yet other embodiments, the spent drilling and/or drill-in fluid 122 may be transferred from the transport and/or storage tank or vessel through a filter media containing the precipitant.

In certain embodiments, after the precipitate is added to the spent drilling and/or drill-in fluid 122, the fluid may be transferred to a separation apparatus, as discussed above, to remove at least a portion of the precipitate. In certain embodiments, the "cleaned" drilling and/or drill-in fluid with the precipitant at least partially removed and having a reduced concentration of zinc may then be transferred to another separation or removal apparatus, as discussed above, to remove at least a portion of the solids (e.g., lost circulation materials and bridging agents) in the fluid. In other embodiments, the spent drilling and/or drill-in fluid 122 may be transferred to a separation or removal apparatus to remove at least a portion of the solids in the fluid prior to the addition of the precipitant. The final "cleaned" drilling and/or drill-in fluid (e.g., the aqueous base fluid) may be stored in a third tank or vessel for a period of time at the off-site location or for transport to a wellsite location.

Once back at the wellsite, one or more components (e.g., viscosifiers, lost circulation materials, and bridging agents) disclosed herein may be added to the "cleaned" drilling and/or drill-in fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the components may be added to the drilling and/or drill-in fluid 122 at any other location in the drilling assembly 100, any other wellsite location, or an off-site location to facilitate its proper function.

As mentioned above, the drilling and/or drill-in fluid 122 of the present disclosure may directly or indirectly affect the components and equipment of the drilling assembly 100. For example, the disclosed drilling and/or drill-in fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and/or any fluid reclamation equipment. The fluid processing unit(s) 128 may further include one or more sensors, gauges, pumps, compressors, and the like used to store, monitor, regulate, and/or recondition the drilling and/or drill-in fluid 122.

The drilling and/or drill-in fluid 122 of the present disclosure may directly or indirectly affect the pump 120, which representatively includes any conduits, pipelines, trucks, tubulars, and/or pipes used to fluidically convey the drilling and/or drill-in fluid 122 downhole, any pumps, compressors, or motors (e.g., topside or downhole) used to drive the drilling and/or drill-in fluid 122 into motion, any valves or related joints used to regulate the pressure or flow rate of the drilling and/or drill-in fluid 122, and any sensors (i.e., pressure, temperature, flow rate, etc.), gauges, and/or combinations thereof, and the like. The disclosed drilling and/or drill-in fluid 122 may also directly or indirectly affect the mixing hopper 134 and the retention pit 132 and their assorted variations.

The drilling and/or drill-in fluid 122 of the present disclosure may also directly or indirectly affect the various downhole equipment and tools that may come into contact with the drilling and/or drill-in fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling and/or drill-in fluid 122 may also directly or indirectly affect any downhole heat exchangers, valves and corresponding actuation devices, tool seals, packers and other wellbore isolation devices or components, and the like associated with the wellbore 116. The disclosed drilling and/or drill-in fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling and/or drill-in fluid 122 of the present disclosure may also directly or indirectly affect any transport or delivery equipment used to convey the drilling and/or drill-in fluid 122 to the drilling assembly 100 such as, for example, any transport vessels, conduits, pipelines, trucks, tubulars, and/or pipes used to fluidically move the drilling and/or drill-in fluid 122 from one location to another, any pumps, compressors, or motors used to drive the drilling and/or drill-in fluid 122 into motion, any valves or related joints used to regulate the pressure or flow rate of the drilling and/or drill-in fluid 122, and any sensors (i.e., pressure and temperature), gauges, and/or combinations thereof, and the like.

An embodiment of the present disclosure is a method including: providing a fluid comprising an aqueous base fluid and zinc; and adding a precipitant comprising polyvinylpyrrolidone or any derivative thereof to the fluid to form a precipitate with at least a portion of the zinc.

In one or more embodiments described in the preceding paragraph, removing at least a portion of the precipitate from the fluid. In one or more embodiments described in the preceding paragraph, the concentration of zinc in the fluid is reduced after removing the portion of the precipitate from the aqueous base fluid. In one or more embodiments described in the preceding paragraph, removing the portion of the precipitate from the fluid comprises passing the fluid through a filter media. In one or more embodiments described in the preceding paragraph, adding one or more additives to the aqueous base fluid after the portion of the precipitate has been separated from the aqueous base fluid to form a treatment fluid; and introducing the treatment fluid into at least a portion of the subterranean formation. In one or more embodiments described in the preceding paragraph, the fluid was used to treat at least a portion of a subterranean formation. In one or more embodiments described in the preceding paragraph, adding lime to the fluid, wherein the lime causes at least a portion of the zinc to become insoluble in the fluid. In one or more embodiments described in the preceding paragraph, the precipitant is a powder or a solution. In one or more embodiments described in the preceding paragraph, adding the precipitant to the fluid to form the precipitate comprises adding a second fluid comprising the precipitant to the fluid. In one or more embodiments described in the preceding paragraph, applying one or more sonication or cavitation techniques to the second fluid before adding the second fluid to the fluid. In one or more embodiments described in the preceding paragraph, adding the precipitant to the fluid to form the precipitate comprises passing the fluid through a filter media that comprises the precipitant. In one or more embodiments described in the preceding paragraph, the aqueous base fluid is a brine having a density less than about 14.8 ppg.

An embodiment of the present disclosure is a method including: providing a fluid comprising an aqueous base fluid and zinc; adding a precipitant comprising polyvinylpyrrolidone or any derivative thereof; allowing the precipitant to form a precipitate with the zinc; and separating at least a portion of the precipitate from the fluid.

In one or more embodiments described in the preceding paragraph, adding lime to the fluid, wherein the lime causes at least a portion of the zinc to become insoluble in the fluid. In one or more embodiments described in the preceding paragraph, adding the precipitant to the fluid to form the precipitate comprises adding a second fluid comprising the precipitant to the fluid. In one or more embodiments described in the preceding paragraph, aqueous base fluid is a brine having a density less than about 14.8 ppg.

An embodiment of the present disclosure is a method including: adding a precipitant comprising polyvinylpyrrolidone or any derivative thereof to a fluid comprising an aqueous base fluid and zinc, wherein the precipitant forms a precipitate with the zinc in the fluid; and passing the fluid through a filter media to remove at least a portion of the precipitate thereby reducing the concentration of the zinc in the fluid.

In one or more embodiments described in the preceding paragraph, the filter media comprises the precipitant. In one or more embodiments described in the preceding paragraph, adding lime to the fluid, wherein the lime causes at least a portion of the zinc to become insoluble in the fluid. In one or more embodiments described in the preceding paragraph, adding the precipitant to the fluid to form the precipitate comprises adding a second fluid comprising the precipitant to the fluid.

EXAMPLES

To facilitate a better understanding of the present disclosure, the following examples of certain aspects of certain embodiments are given. The following examples are not the only examples that could be given according to the present disclosure and are not intended to limit the scope of the disclosure or claims.

Example 1

A zinc-containing calcium bromide brine in accordance with certain embodiments of the present disclosure was prepared by combining 100 mL of calcium bromide brine (14.2 ppg) and 1 mL of zinc bromide solution (19.2 ppg). A polyvinylpyrrolidone-containing calcium bromide brine was prepared by combining 350 mL of a calcium bromide brine (14.2 ppg) and crosslinked polyvinylpyrrolidone (8 lb/bbl). The polyvinylpyrrolidone-containing calcium bromide brine was sonicated, in accordance with certain embodiments of the present disclosure, for 90 minutes using a 500 watt ultrasonicator with a ¼ inch probe tip operating with an amplitude of 100 microns. The temperature of the polyvinylpyrrolidone-containing calcium bromide brine was maintained at about room temperature by placing the brine in an ice water bath during sonication.

Four 20 mL samples of the zinc-containing calcium bromide were created. Sample 1 served as the control sample, and varying amounts of the polyvinylpyrrolidone-containing calcium bromide brine were added to each of Samples 2-4, as shown in Table 1 below, in accordance with certain embodiments of the present disclosure. A precipitate formed in each of Samples 2-4, and the precipitate was separated from the brine using filter paper and vacuum filtration. The concentration of zinc remaining in each sample was measured. As shown in Table 1, the percent reduction of the zinc concentration increased as more of the polyvinylpyrrolidone-containing calcium bromide brine was added to the sample. Thus, Example 1 demonstrates that the zinc concentration in a fluid may be reduced by combining the fluid with a second fluid including polyvinylpyrrolidone. Additionally, Example 1 demonstrates that the reduction of the zinc concentration is attributable not only to dilution but also from the precipitation of the zinc with the polyvinylpyrrolidone.

TABLE 1

| Sample | PVP-Containing Brine (mL) | Zinc (ppm) | Zinc Reduction (%) |
|---|---|---|---|
| 1 | 0 | 2,427 | — |
| 2 | 2.5 | 1,818 | 25 |
| 3 | 5 | 1,435 | 41 |
| 4 | 10 | 893 | 63 |

Example 2

A zinc-containing calcium bromide brine in accordance with certain embodiments of the present disclosure was prepared by combining 200 mL of calcium bromide brine (14.2 ppg) and 2 mL of zinc bromide solution (19.2 ppg) (the "Control Brine"). Six samples containing the Control Brine were created as described below. Sample 5 consisted of 20 mL of the Control Brine. Sample 6 was prepared by mixing 50 mL of the Control Brine with 300 mg of lime. Sample 6 was stirred and filtered using filter paper and vacuum filtration. Sample 7 was prepared by mixing 20 mL of the filtrate from Sample 6 with 10 mL of a calcium bromide brine (14.2 ppg) including polyvinylpyrrolidone (8 lb/bbl). As in Example 1, the calcium bromide brine (14.2 ppg) including polyvinylpyrrolidone (8 lb/bbl) was sonicated, in accordance with certain embodiments of the present disclosure, for 90 minutes using a 500 watt ultrasonicator with a ¼ inch probe tip operating with an amplitude of 100 microns. The temperature of the calcium bromide brine (14.2 ppg) including polyvinylpyrrolidone (8 lb/bbl) was maintained at about room temperature by placing the brine in an ice water bath during sonication. Sample 7 was stirred and filtered using filter paper and vacuum filtration. Sample 8 was prepared by mixing 50 mL of the Control Brine with 25 mL of the sonicated calcium bromide brine (14.2 ppg) including polyvinylpyrrolidone (8 lb/bbl). Sample 8 was stirred and filtered using filter paper and vacuum filtration. Sample 9 was prepared by mixing 20 mL of the filtrate from Sample 8 with 120 mL of lime. Sample 9 was stirred and filtered using filter paper and vacuum filtration. Sample 10 was prepared by mixing 20 mg of the Control Brine with 0.5 grams of dry, crosslinked polyvinylpyrrolidone. The dry, crosslinked polyvinylpyrrolidone was not sonicated in any manner. Sample 10 was stirred and filtered using filter paper and vacuum filtration. As shown in Table 2, the zinc concentration of Sample 5 and the filtrates from each of Samples 6-10 was measured.

TABLE 2

| Sample | Fluid | Zinc (ppm) | Zinc Reduction (%) |
|---|---|---|---|
| 5 | 20 mL Control Brine | 4,119 | — |
| 6 | 50 mL Control Brine + 300 mg lime | 2386 | 42 |
| 7 | 20 mL Sample 6 filtrate + 10 mL PVP-containing brine | 876 | 79 |
| 8 | 50 mL Control Brine + 25 mL PVP-containing brine | 1,887 | 54 |
| 9 | 20 mL Sample 8 filtrate + 120 mg lime | 918 | 78 |
| 10 | 20 mL Control Brine + 0.5 g crosslinked PVP | 3,788 | 8 |

As shown in Table 2, the zinc concentration in each of Samples 6-10 was reduced as compared to Sample 5, which contained only the Control Brine. Thus, Example 2 demonstrates that the zinc concentration in a fluid may be reduced by combining the fluid with a second fluid including polyvinylpyrrolidone. Additionally, Example 2 demonstrates that the combination of a precipitant including polyvinylpyrrolidone and lime achieve a greater reduction in the zinc concentration in a fluid when compared to the precipitant including polyvinylpyrrolidone or the lime alone.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those of ordinary skill in the art having the benefit of the teachings herein. While numerous changes may be made by those of ordinary skill in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   recovering a fluid from a wellbore comprising an aqueous base fluid and zinc,
      wherein the fluid was used to treat at least a portion of a subterranean formation;
      wherein the fluid comprises zinc in an amount of about 5 ppm to about 4120 ppm:
   and adding a precipitant comprising polyvinylpyrrolidone or any derivative thereof to the fluid to form a precipitate with at least a portion of the zinc,
      wherein the precipitate is formed outside of the subterranean formation;
      wherein the polyvinylpyrrolidone or any derivative thereof has a molecular weight of at least 6,000 g/mol.

2. The method 1 further comprising removing at least a portion of the precipitate from the fluid.

3. The method of claim 2, wherein the concentration of zinc in the fluid is reduced after removing the portion of the precipitate from the aqueous base fluid.

4. The method of claim 2, wherein removing the portion of the precipitate from the fluid comprises passing the fluid through a filter media.

5. The method of claim 2 further comprising:
   adding one or more additives to the aqueous base fluid after the portion of the precipitate has been separated from the aqueous base fluid to form a treatment fluid; and
   introducing the treatment fluid into at least a portion of the subterranean formation.

6. The method of claim 1 further comprising adding lime to the fluid, wherein the lime causes at least a portion of the zinc to become insoluble in the fluid.

7. The method of claim 1, wherein the precipitant is a powder or a solution.

8. The method of claim 1, wherein adding the precipitant to the fluid to form the precipitate comprises adding a second fluid comprising the precipitant to the fluid.

9. The method of claim 1 further comprising applying one or more sonication or cavitation techniques to the precipitant.

10. The method of claim 1, wherein adding the precipitant to the fluid to form the precipitate comprises passing the fluid through a filter media that comprises the precipitant.

11. The method of claim 1, wherein the aqueous base fluid is a brine having a density less than about 14.8 ppg.

12. A method comprising:
   recovering a fluid comprising an aqueous base fluid and zinc;
      wherein the fluid comprises zinc in an amount of about 5 ppm to about 4120 ppm;
   applying one or more sonication or cavitation techniques to a precipitant comprising polyvinylpyrrolidone or any derivative thereof having a molecular weight of at least 6,000 g/mol.;
   adding the precipitant to the fluid;
   allowing the precipitant to form a precipitate with the zinc; and
   separating at least a portion of the precipitate from the fluid.

13. The method of claim 12 further comprising adding lime to the fluid, wherein the lime causes at least a portion of the zinc to become insoluble in the fluid.

14. The method of claim 12, wherein adding the precipitant to the fluid to form the precipitate comprises adding a second fluid comprising the precipitant to the fluid.

15. The method of claim 12, wherein aqueous base fluid is a brine having a density less than about 14.8 ppg.

16. A method comprising:
   adding a precipitant comprising polyvinylpyrrolidone or any derivative thereof to a wellbore fluid comprising an aqueous base fluid and zinc,
      wherein the precipitant forms a precipitate with the zinc in the fluid;
      wherein the wellbore fluid comprises zinc in an amount of about 5 ppm to about 4120 ppm;
   adding lime to the wellbore fluid, wherein the lime causes at least a portion of the zinc to become insoluble in the fluid, and
   passing the fluid through a filter media to remove at least a portion of the precipitate thereby reducing the concentration of the zinc in the fluid, wherein the filter media comprises the precipitate.

17. The method of claim 16, wherein adding the precipitant to the fluid to form the precipitate comprises adding a second fluid comprising the precipitant to the fluid.

18. The method of claim 12, wherein the fluid was used to treat at least a portion of a subterranean formation.

19. The method of claim 6, wherein adding the precipitant to the fluid to form the precipitate comprises passing the fluid through a filter media that comprises the precipitant.

20. The method of claim 16 further comprising applying one or more sonication or cavitation techniques to the precipitant before adding the precipitant to the fluid.

* * * * *